US010464020B1

(12) United States Patent
Lee et al.

(10) Patent No.: US 10,464,020 B1
(45) Date of Patent: Nov. 5, 2019

(54) HYDROGEN PEROXIDE VAPOR DETOXIFYING SYSTEM USING HONEYCOMB STRUCTURE

(71) Applicant: KOREA INSTITUTE OF SCIENCE AND TECHNOLOGY, Seoul (KR)

(72) Inventors: Kang Bong Lee, Seoul (KR); Yeong Cheon Kim, Seoul (KR); Yun Sik Nam, Seoul (KR); Jin Oh Jeon, Seoul (KR); Jong Ho Park, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 16/258,142

(22) Filed: Jan. 25, 2019

(30) Foreign Application Priority Data

Oct. 5, 2018 (KR) .................. 10-2018-0118938

(51) Int. Cl.
| | | |
|---|---|---|
| *B01D 53/86* | (2006.01) | |
| *B01D 53/96* | (2006.01) | |
| *B01D 53/76* | (2006.01) | |
| *C01B 15/013* | (2006.01) | |
| *B01J 35/04* | (2006.01) | |
| *B01J 23/44* | (2006.01) | |

(52) U.S. Cl.
CPC ............. *B01D 53/96* (2013.01); *B01D 53/76* (2013.01); *B01D 53/8696* (2013.01); *B01J 23/44* (2013.01); *B01J 35/04* (2013.01); *C01B 15/013* (2013.01); *B01D 2221/08* (2013.01); *B01D 2257/93* (2013.01); *B01J 2523/828* (2013.01)

(58) Field of Classification Search
None
See application file for complete search history.

(56) References Cited

U.S. PATENT DOCUMENTS

| | | | | |
|---|---|---|---|---|
| 2010/0112677 A1* | 5/2010 | Onishi | .................... | A61L 2/202 435/283.1 |
| 2010/0196216 A1* | 8/2010 | Yokoi | .................... | A61L 2/208 422/128 |
| 2011/0091354 A1* | 4/2011 | Schwartz | ................. | A61L 2/22 422/28 |

FOREIGN PATENT DOCUMENTS

| | | |
|---|---|---|
| KR | 10-1484689 B1 | 1/2015 |
| KR | 10-2016-0083423 A | 7/2016 |
| KR | 10-1647480 B1 | 8/2016 |

(Continued)

OTHER PUBLICATIONS

Bishop et al. Advanced Regenerable HEPA Filters Based on Ceramic Honeycomb Materials. WM'04 Conference. Feb. 29-Mar. 4, Tucson, AZ. pp. 1-13. http://archive.wmsym.org/2004/pdfs/4510.pdf (Year: 2004).*

*Primary Examiner* — Jelitza M Perez
(74) *Attorney, Agent, or Firm* — Birch, Stewart, Kolasch & Birch, LLP

(57) ABSTRACT

The present disclosure relates to a hydrogen peroxide vapor decomposition and detoxification system including a hydrogen peroxide vapor suction unit which sucks hydrogen peroxide vapor in a target space to be sterilized, a hydrogen peroxide vapor decomposition and detoxification unit which decomposes the sucked hydrogen peroxide vapor, a vapor discharge unit which discharges decomposition products of the hydrogen peroxide vapor, and a control unit which controls an amount of vapor suction of the vapor suction unit, decomposition and detoxification of the hydrogen peroxide vapor decomposition and detoxification unit, and the vapor discharge unit.

17 Claims, 11 Drawing Sheets

(56) References Cited

FOREIGN PATENT DOCUMENTS

| KR | 10-1669551 B1 | 10/2016 |
|---|---|---|
| KR | 10-1887112 B1 | 9/2018 |

\* cited by examiner

HYDROGEN PEROXIDE VAPOR DETOXIFYING SYSTEM USING HONEYCOMB STRUCTURE

CROSS-REFERENCE TO RELATED APPLICATION

This application claims priority to Korean Patent Application No. 10-2018-0118938, filed on Oct. 5, 2018, and all the benefits accruing therefrom under 35 U.S.C. § 119, the contents of which in its entirety are herein incorporated by reference.

BACKGROUND

1. Field

The present disclosure relates to a hydrogen peroxide vapor detoxification system, and more particularly, to a system for hydrogen peroxide decomposition through platinum and palladium catalyst decomposition, by fumigating an indoor or predetermined space contaminated with pathogenic microorganisms or viruses using fumigated hydrogen peroxide, and heating hydrogen peroxide vapor remaining after sterilization to allow it to pass through multi-honeycomb meshwire catalyst cylinders.

2. Description of the Related Art

In general, a method for sterilization by generating hydrogen peroxide vapor (HPV) generates active oxygen (oxygen free radical) from hydrogen peroxide molecules, and uses it as a disinfectant for decomposition and sterilization of different types of fungus, bacteria, viruses and gemmules.

However, because hydrogen peroxide vapor is a toxic compound that is harmful to human body, it is necessary to decompose and detoxify hydrogen peroxide vapor remaining after use with water and oxygen by decomposition catalysts.

That is, when it touches the human body or it is inhaled into the human body, hydrogen peroxide vapor causes irritation or inflammation on the skin and is vital to the respiratory organ including the nose, throat and lung, and has a risk of corneal damage and vision loss.

Accordingly, it is necessary to decompose and detoxify $H_2O_2$ vapor used to completely eliminate pathogenic microorganisms and viruses quickly and completely.

Additionally, the conventional decomposition and detoxification of hydrogen peroxide vapor occupies the process time up to 80% of the entire sanitation process, so there is a need to develop equipment and systems for reducing the hydrogen peroxide vapor decomposition and detoxification process and time.

RELATED LITERATURES

Patent Literatures

Patent Literature 1: Korean Patent Application Publication No. 10-2016-0083423 A
Patent Literature 2: Korean Patent Publication No. 10-1669551 B1

SUMMARY

In general, dilution of mixing hydrogen peroxide vapor with air is the simplest method, but contamination of ambient air with hydrogen peroxide may result in toxicity damage caused by secondary contamination, and thus indoor decomposition and removal is necessary.

For example, as shown in FIG. 14, a system 1000 disclosed by Patent Literature 1 sterilizes a target space through a discharge unit 1002 using hydrogen peroxide vapor vaporized through a heating unit 1001, but the system disclosed by Patent Literature 1 detoxifies hydrogen peroxide vapor through ventilation of hydrogen peroxide vapor exposed to the sterilized air.

Additionally, as shown in FIG. 15, Patent Literature 2 also does not consider a method of effectively detoxifying the discharged sterilizing solution.

So far, decomposition and detoxification of sprayed hydrogen peroxide vapor in a target space includes installing hydrogen peroxide vapor generation equipment inside and performing sterilization and then detoxification, and in this instance, it takes much time to lower the concentration of hydrogen peroxide vapor in the indoor space below the limited concentration, causing problems with reductions in the efficiency of equipment use, and the reuse and efficacy of decomposition catalysts.

Accordingly, to efficiently decompose and detoxify hydrogen peroxide vapor, there is an increasing demand for a hydrogen peroxide vapor decomposition and detoxification system that uses a plurality of honeycomb structures, and efficiently sucks hydrogen peroxide vapor present in an indoor and target space to be sterilized and its surface through the honeycomb structures using decomposition and detoxification equipment, and then heats the sucked air by a heating unit to improve the decomposition efficiency.

To achieve the above-described object, the present disclosure may provide a hydrogen peroxide vapor decomposition and detoxification system including a plurality of hydrogen peroxide vapor suction units which sucks hydrogen peroxide vapor in a target space to be sterilized, a hydrogen peroxide vapor decomposition and detoxification unit which decomposes the sucked hydrogen peroxide vapor, a vapor discharge unit which discharges decomposition products of the hydrogen peroxide vapor, and a control unit which controls an amount of vapor suction of each hydrogen peroxide vapor suction unit, decomposition and detoxification of the hydrogen peroxide vapor decomposition and detoxification unit, and the vapor discharge unit.

Additionally, the hydrogen peroxide vapor decomposition and detoxification system of the present disclosure may further include casters to move the hydrogen peroxide vapor decomposition and detoxification system, and the casters may further include an electric-driven device that can operate by a wireless signal.

Additionally, the vapor decomposition and detoxification system of the present disclosure may further include casters to move the hydrogen peroxide vapor decomposition and detoxification system, and the casters may further include an electric-driven device that can operate by a wireless signal.

Additionally, the vapor suction unit of the present disclosure may further include a first decomposition unit to decompose the hydrogen peroxide vapor, and the first decomposition unit may be a first honeycomb structure that is hermetically fixed to a suction opening formed in each of the plurality of vapor suction units.

Additionally, the first honeycomb structure of the present disclosure may include platinum and palladium as a hydrogen peroxide decomposition catalyst.

Additionally, the hydrogen peroxide vapor decomposition and detoxification unit of the present disclosure may further include a heating unit to heat the vapor decomposed from the first decomposition unit.

Additionally, the heating unit of the present disclosure may heat the vapor decomposed from the first decomposition unit in a range of room temperature to 250° C.

Additionally, the hydrogen peroxide vapor decomposition and detoxification unit of the present disclosure may further include a second decomposition unit to decompose the hydrogen peroxide vapor heated from the heating unit, and the second decomposition unit may include a plate which is hermetically fixed to a housing of the hydrogen peroxide vapor decomposition and detoxification unit, and a second honeycomb structure which is hermetically fixed to each of a plurality of openings formed in the plate.

Additionally, the second honeycomb structure of the present disclosure may include platinum and palladium as a hydrogen peroxide decomposition catalyst.

Additionally, the hydrogen peroxide vapor discharge unit of the present disclosure may further include a fan unit having a fan, of which rotation speed can be adjusted by the control unit.

Additionally, the hydrogen peroxide vapor discharge unit of the present disclosure may include a cover which covers a top and a plurality of discharge openings formed in a side, and the decomposition products of the hydrogen peroxide vapor may be discharged through the side.

Additionally, the hydrogen peroxide vapor decomposition and detoxification system of the present disclosure may further include a sensor to measure a temperature of the heating unit, a humidity of the target space to be sterilized, and a concentration of hydrogen peroxide vapor included in the target space to be sterilized, and a display unit to display the temperature of the heating unit and the fan speed.

The present disclosure has a plurality of air suction ports mounted thereon, to efficiently suck hydrogen peroxide vapor distributed in a target space to be sterilized, and at the same time as suction, decomposes hydrogen peroxide vapor by the honeycomb structure, thereby maximizing the decomposition efficiency.

Additionally, the honeycomb structure of the present disclosure is in the shape of a cylindrical cylinder and does not reduce the air flow and the pressure, and the heating unit installed can improve the decomposition efficiency.

Additionally, when air sucked through the fan of the present disclosure is discharged, the circulation speed of air in the target space to be sterilized increases, and air in the target space to be sterilized helps the transport to the suction port, thereby maximizing the quick decomposition efficiency of hydrogen peroxide vapor, and reducing the total time of the hydrogen peroxide sterilization process.

Additionally, the present disclosure provides a simple hydrogen peroxide vapor decomposition and detoxification system as a separate system that is different from hydrogen peroxide fumigation equipment, by simplifying connection to the upper and lower parts of the entire system to reduce the size and weight, leading to quick response to the environment and situation.

Additionally, the present disclosure can prevent the pressure rise and airflow reduction in the step of suction and discharge of hydrogen peroxide vapor, and reduce its consequential burden on equipment.

DETAILED DESCRIPTION

Hereinafter, a hydrogen peroxide vapor detoxification system 1 according to an embodiment of the present disclosure will be described through the preferred embodiments of the present disclosure on the basis of the accompanying drawings.

Prior to the description, in many embodiments, the elements having the same configurations will be representatively described in an embodiment using the same reference signs, and in other embodiments, only different elements will be described.

Meanwhile, to clearly describe an operational relationship of the hydrogen peroxide vapor detoxification system 1 according to an embodiment of the present disclosure, a flow of hydrogen peroxide vapor is indicated by an arrow.

Meanwhile, to clearly describe an operational relationship of the hydrogen peroxide vapor decomposition and detoxification system 1 according to an embodiment of the present disclosure, it is divided into each function as shown.

Figure 1:
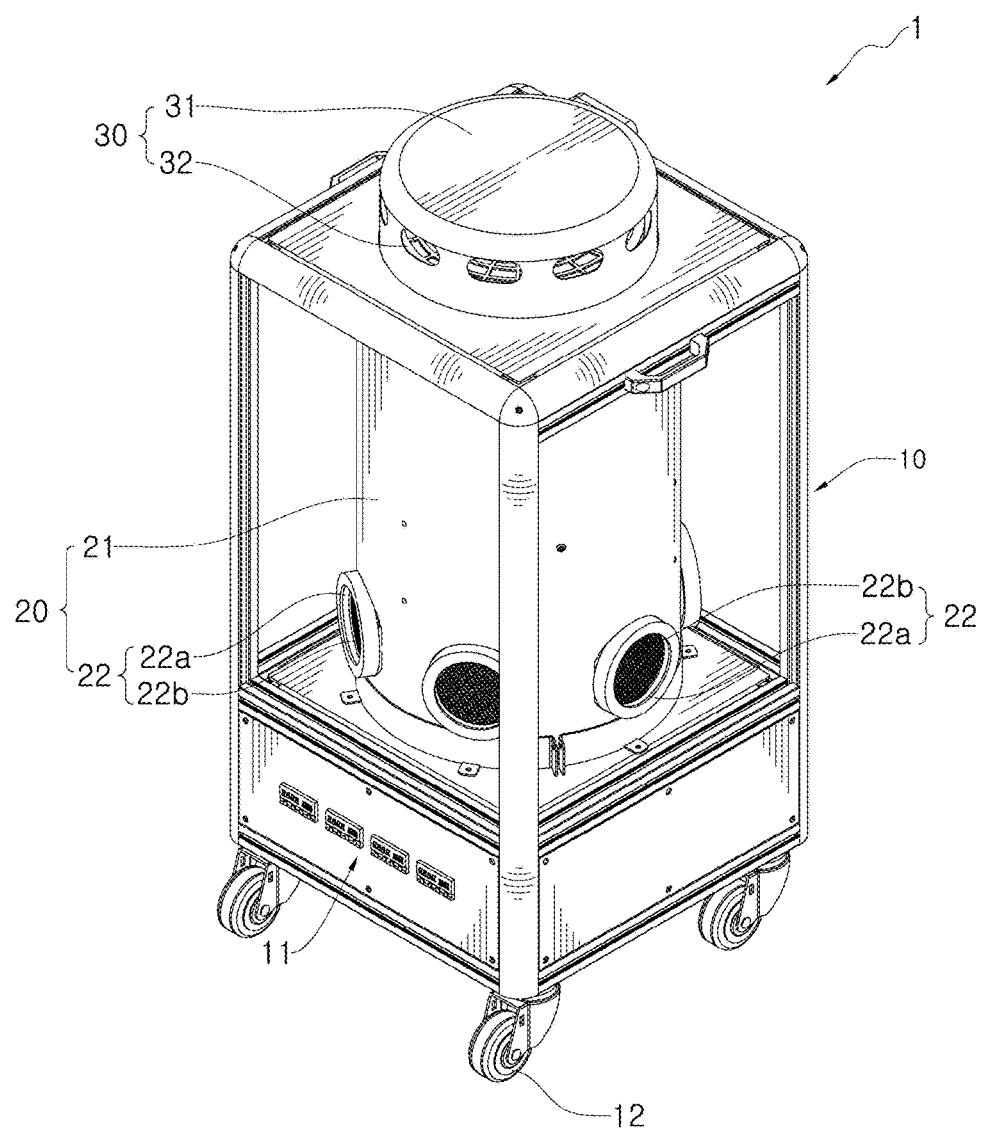
FIG. 1 is a schematic perspective view of a hydrogen peroxide vapor detoxification system according to an embodiment of the present disclosure when viewed from the front side.
Figure 2:
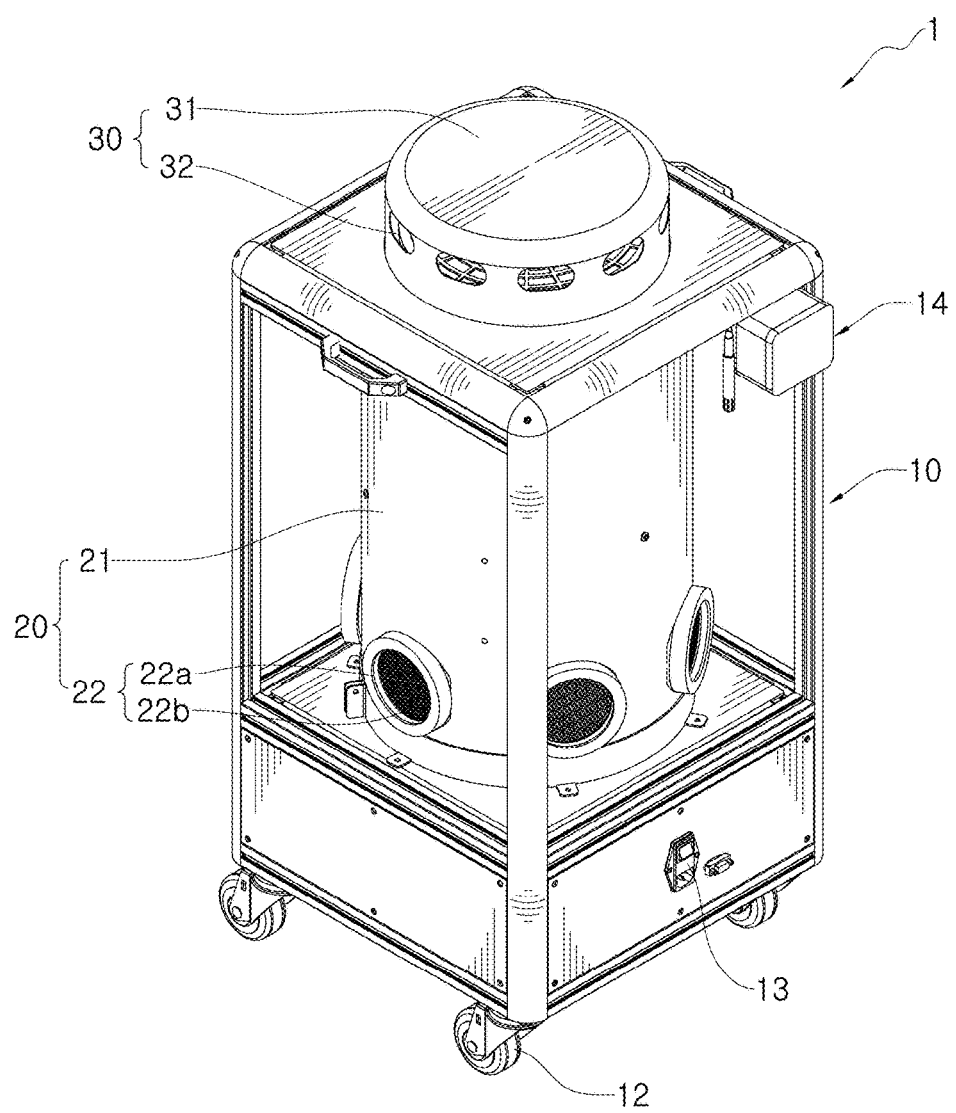
FIG. 2 is a schematic perspective of the hydrogen peroxide vapor detoxification system shown in FIG. 1 when viewed from the rear side.

FIG. 1 is a schematic perspective view of the hydrogen peroxide vapor detoxification system 1 according to an embodiment of the present disclosure when viewed from the front side, and FIG. 2 is a schematic perspective of the hydrogen peroxide vapor detoxification system 1 shown in FIG. 1 when viewed from the rear side.

As shown in FIGS. 1 and 2, the hydrogen peroxide vapor decomposition and detoxification system 1 includes a frame 10 including the entire structure, and through this, forms the entire structure.

The hydrogen peroxide vapor decomposition and detoxification system 1 according to an embodiment of the present disclosure is structured such that a hydrogen peroxide vapor suction unit 22 sucks hydrogen peroxide vapor, a vapor decomposition and detoxification unit 20 sucks and decomposes hydrogen peroxide vapor, and the decomposition products of hydrogen peroxide vapor are discharged through a vapor discharge unit 30.

Additionally, casters for movement 12 are installed for movement and space sterilization of the hydrogen peroxide vapor decomposition and detoxification system 1, and the casters for movement have an electric-driven device (not shown) that can operate by a wireless signal, so the entire hydrogen peroxide vapor decomposition and detoxification system 1 can freely move in a target space through control of a wireless signal.

Additionally, the hydrogen peroxide vapor decomposition and detoxification system 1 according to an embodiment of the present disclosure may include a control unit 11 to control an amount of vapor suction of a vapor suction unit 22a, an amount of decomposition and detoxification of the decomposition and detoxification unit 20, and an amount of hydrogen peroxide vapor decomposition products discharged by the vapor discharge unit 30.

Additionally, the control unit 11 can control the temperature of a heating unit 25 as described below, and measure the humidity of the target space to be sterilized and the concentration of hydrogen peroxide vapor in the target space to be sterilized through a sensor 14. Meanwhile, the operation of the entire hydrogen peroxide vapor decomposition and detoxification system 1 can be turned on/off through a power source unit 13 disposed at the lower part of the frame 10.

Figure 3:
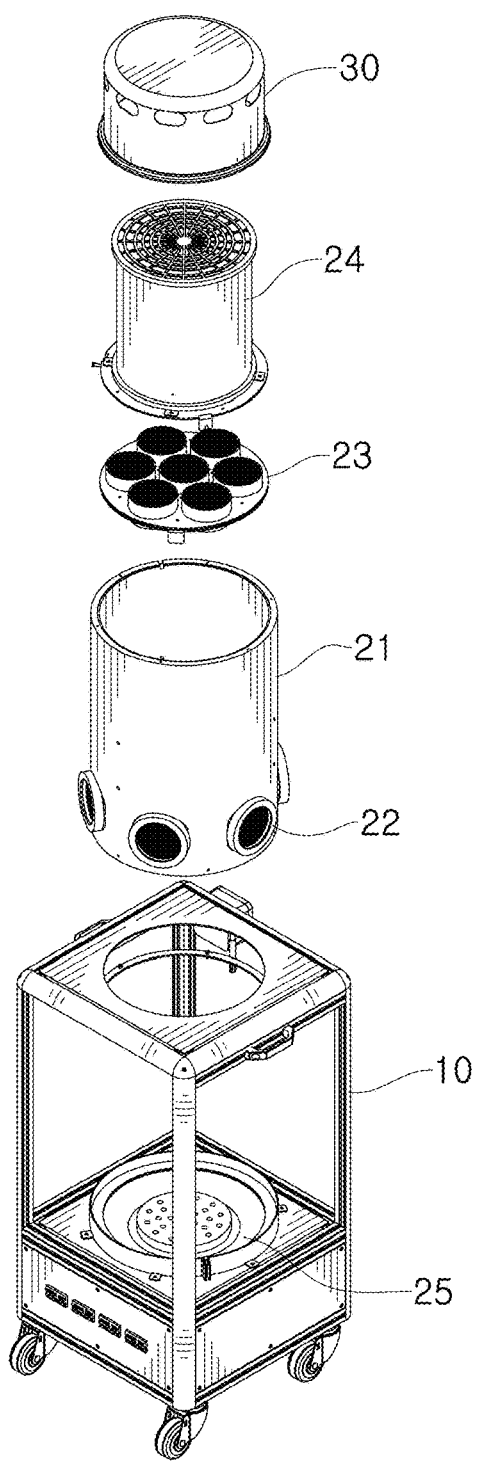
FIG. 3 is a schematic exploded perspective view showing the elements of a hydrogen peroxide vapor detoxification system according to an embodiment of the present disclosure.
Figure 4:
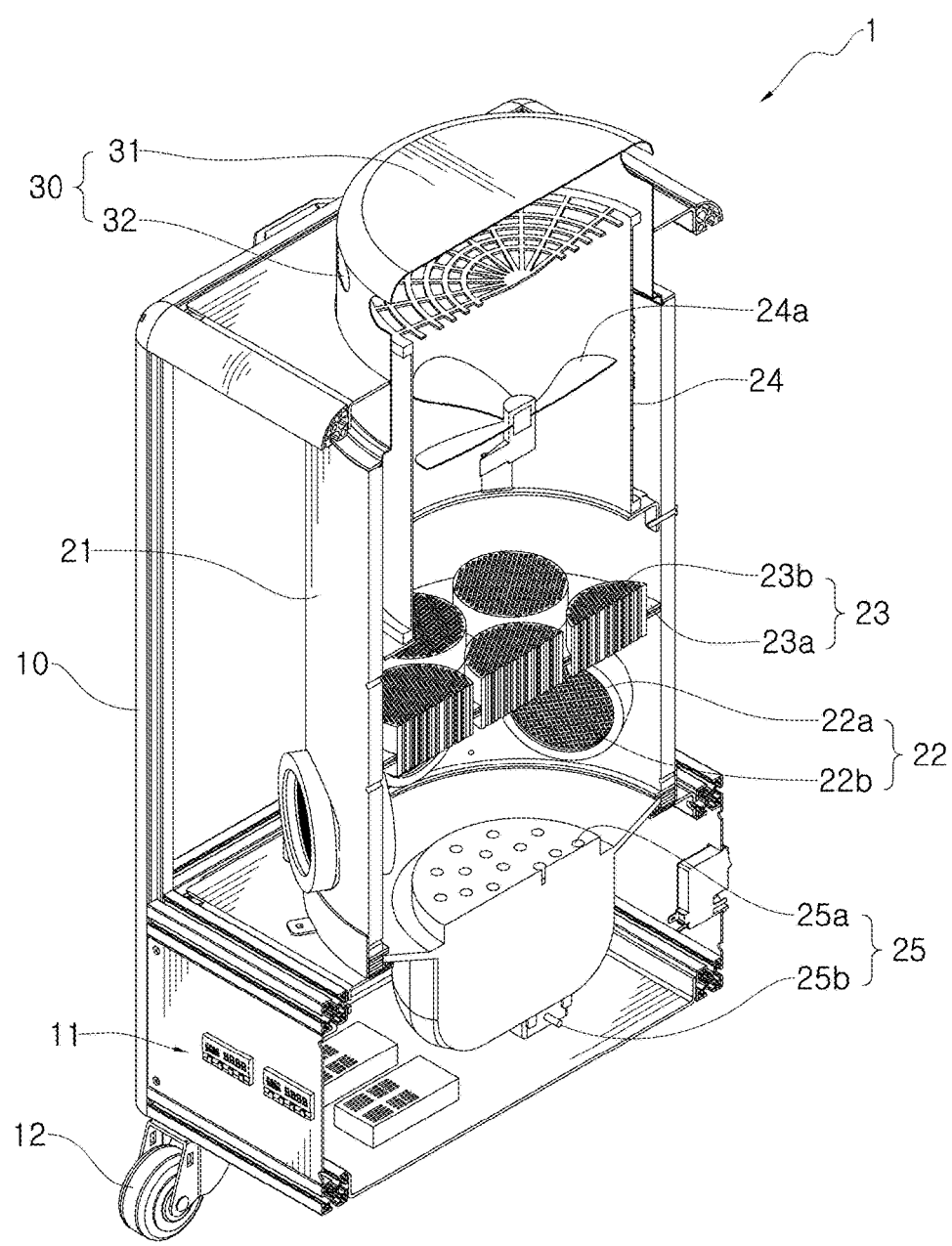
FIG. 4 is a cross-sectional perspective view showing the inner part of a hydrogen peroxide vapor detoxification system according to an embodiment of the present disclosure.

FIG. 3 is a schematic exploded perspective view showing the elements of the hydrogen peroxide vapor detoxification system 1 according to an embodiment of the present disclosure, and FIG. 4 is a cross-sectional perspective view showing the inner part of the hydrogen peroxide vapor detoxification system according to an embodiment of the present disclosure.

As shown in FIGS. 3 and 4, a housing 21 in which the vapor decomposition and detoxification unit 20 is installed is mounted in the frame 10, and a heating unit 25 is placed below the vapor decomposition and detoxification unit 20. Additionally, the housing 21 includes a first decomposition unit 22 and a second decomposition unit 23, and a fan unit 24 and the vapor discharge unit 30 are disposed above the second decomposition unit 23.

A detailed description of each element will be provided below through illustrations of FIGS. 5 to 8 and the following descriptions.

Figure 5:
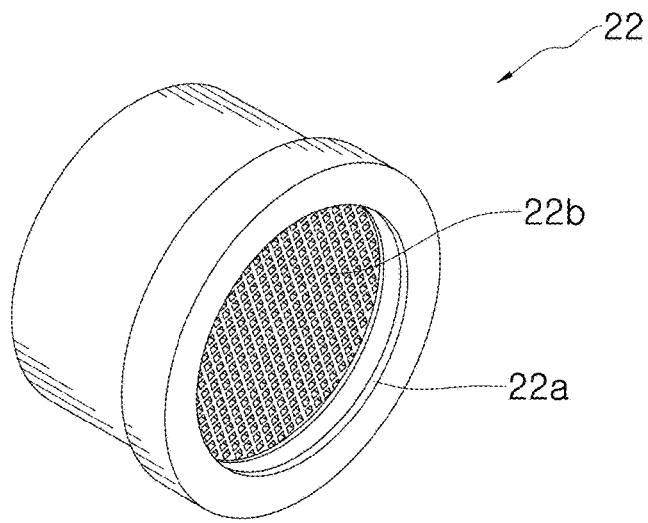
FIG. 5 is a schematic perspective view showing a vapor suction unit of a hydrogen peroxide vapor detoxification system according to an embodiment of the present disclosure.

FIG. 5 is a schematic perspective view showing the vapor suction unit 22 of the hydrogen peroxide vapor detoxification system 1 according to an embodiment of the present disclosure.

As shown in FIGS. 4 and 5, the vapor suction unit 22 is disposed on the side of the lower part of the housing 21, and a first honeycomb structure 22b is hermetically fixed to each of a plurality of suction openings 22a.

The first honeycomb structure 22b is formed with a cylinder shaped catalyst structure, and has a structure in which hydrogen peroxide vapor is sucked, and at the same time, decomposition of hydrogen peroxide is accomplished.

Specifically, the first honeycomb structure 22b maintains its honeycomb shape, and includes hydrogen peroxide vapor decomposition catalysts. Additionally, the first honeycomb structure 22b is a circular cylinder structure, and platinum (Pt) and palladium (Pd) catalysts may be used. And, to increase the decomposition and detoxification efficiency of hydrogen peroxide vapor, a structure including aluminum (Al), silicon (Si) and others and at least one catalyst of iron oxide and nickel oxide may be coated on the structure.

Figure 6:
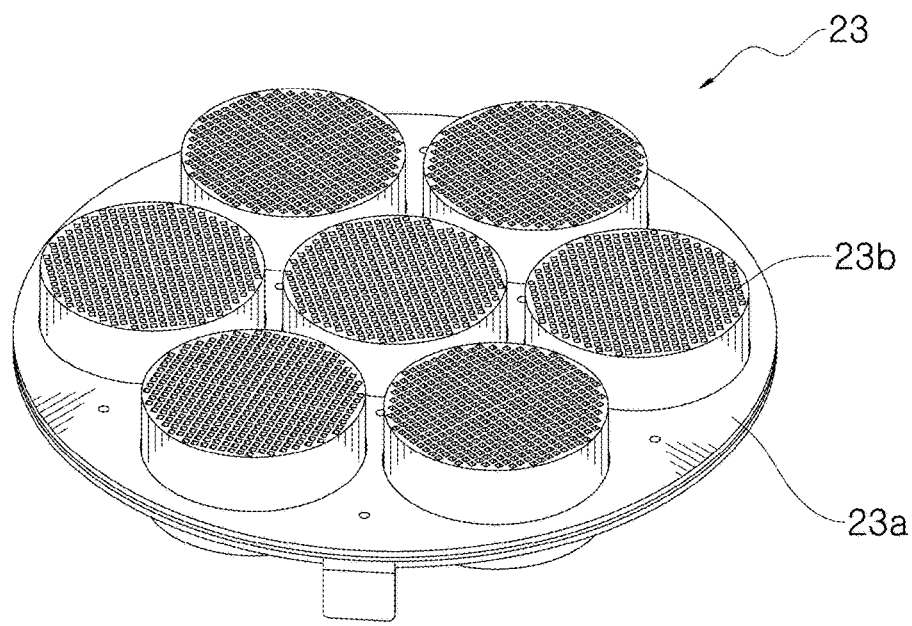
FIG. 6 is a schematic perspective view showing a second decomposition unit of a hydrogen peroxide vapor detoxification system according to an embodiment of the present disclosure.

FIG. 6 is a schematic perspective view showing the second decomposition unit 23 of the hydrogen peroxide vapor detoxification system 1 according to an embodiment of the present disclosure.

As shown in FIGS. 4 and 6, the second decomposition unit 23 includes a plate 23a perfectly hermetically fixed to the housing 21 in the radial direction inside the housing 21, and a second honeycomb structure 23b is hermetically fixed to each of a plurality of openings formed in the plate 23a.

Accordingly, secondary decomposition is performed by the second decomposition unit 23 for an extremely small amount of hydrogen peroxide vapor that has not been primarily decomposed by the first decomposition unit 22, achieving very high decomposition efficiency.

Additionally, as described above, because the inside of the housing 21 of the decomposition and detoxification unit 20 is hermetically sealed fully except the second honeycomb structure 23b, the sucked hydrogen peroxide vapor can only move through the second honeycomb structure 23b.

Meanwhile, in the same way as the first honeycomb structure 22b, the second honeycomb structure 23b is also formed with a cylinder shaped catalyst structure, and is structured such that hydrogen peroxide vapor is sucked, and at the same time, decomposition of hydrogen peroxide is accomplished.

That is, the second honeycomb structure 23b maintains its honeycomb shape, and includes hydrogen peroxide vapor decomposition catalysts, the catalysts may include platinum (Pt) and palladium (Pd) catalysts, and to increase the decomposition and detoxification efficiency of hydrogen peroxide vapor, a structure including aluminum (Al), silicon (Si) and others and at least one catalyst of iron oxide and nickel oxide may be coated on the structure.

Figure 7:
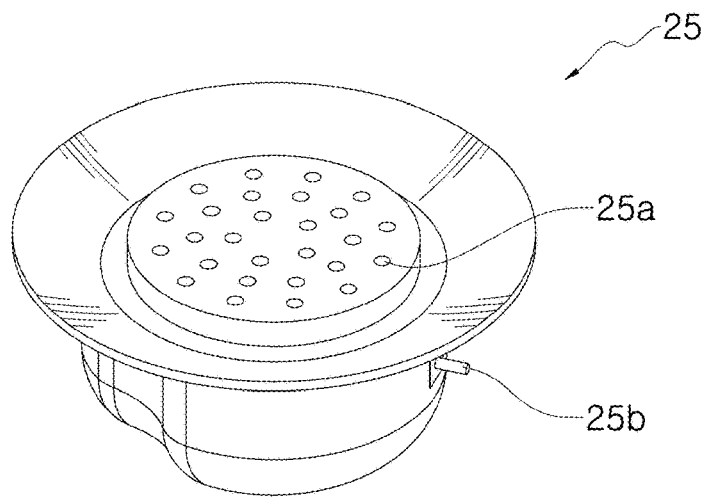
FIG. 7 is a schematic perspective view showing a heating unit of a hydrogen peroxide vapor detoxification system according to an embodiment of the present disclosure.

FIG. 7 is a schematic perspective view showing the heating unit 25 of the hydrogen peroxide vapor detoxification system 1 according to an embodiment of the present disclosure.

As shown in FIGS. 4 and 7, a very small amount of hydrogen peroxide vapor remaining after primary decomposition from the first decomposition unit 22 is heated by the heating unit 25. The heating unit is heated in the range of room temperature to 250° C., and can enhance the decomposition efficiency of a very small amount of hydrogen peroxide vapor by the second decomposition unit 23 as described below.

As shown in FIG. 7, the heating unit 25 heats as an electric heater through electrical connection of an electrical connector 25b, and is designed such that the heated high temperature heat is scanned into a movement passage of the generated high temperature heat in the form of a beam through a heating opening 25a to efficiently decompose hydrogen peroxide vapor. Additionally, the material for the heating unit 25 may include iron plated with zinc and iron and stainless steel.

Meanwhile, as described above, the temperature control of the heating unit 25 can be made through control of the control unit 11, and the heating unit 25 is displayed on a display unit (not shown) to allow a measurer to monitor the temperature of the heating unit 25 of the hydrogen peroxide vapor detoxification system 1 in real time.

Figure 8:
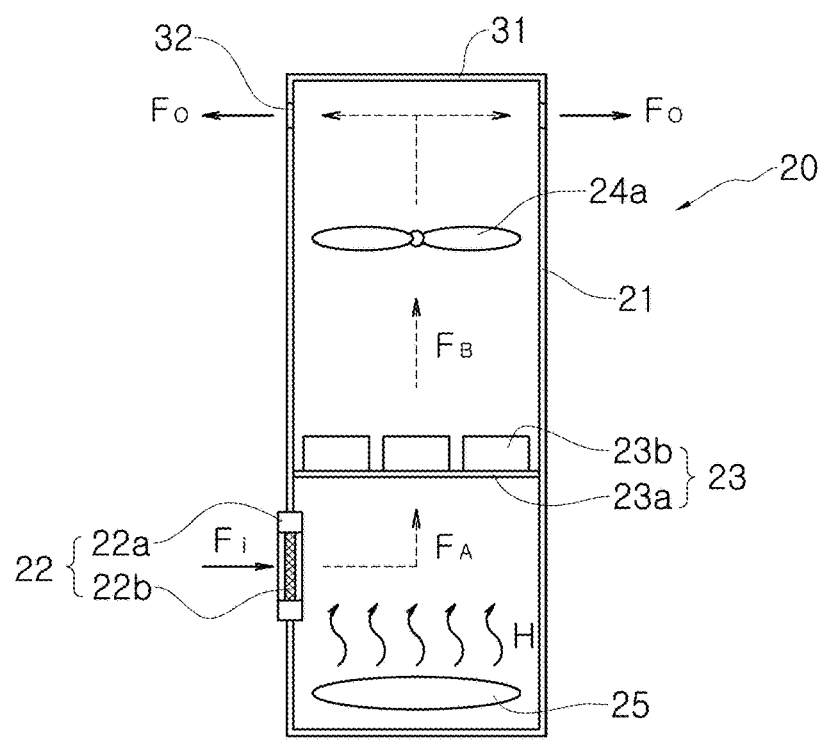
FIG. 8 is a schematic conceptual view showing a detoxification process of a hydrogen peroxide vapor detoxification system according to an embodiment of the present disclosure.

FIG. 8 is a schematic conceptual view showing the detoxification process of the hydrogen peroxide vapor detoxification system 1 according to an embodiment of the present disclosure.

As shown in FIG. 8, hydrogen peroxide vapor (Fi) in the target space to be sterilized is primarily decomposed by the first decomposition unit 22. A very small amount of hydrogen peroxide vapor ($F_A$) remaining in the primarily decomposed decomposition products is heated (H) through the heating unit 25, circulates up, and moves up by a force that sucks a very small amount of hydrogen peroxide vapor ($F_A$) by operation of the fan 24a of the fan unit 24.

Meanwhile, as the rotation speed of the fan 24a can be adjusted through control of the control unit 11, the operating speed of the fan unit 24 may adjust the movement speed of a very small amount of hydrogen peroxide vapor ($F_A$) moving up, and the speed of the fan 24a is also displayed on the above-described display unit (not shown) to allow the measurer to monitor the movement speed of a very small amount of hydrogen peroxide vapor ($F_A$) in real time.

That is, the hydrogen peroxide vapor detoxification system 1 according to an embodiment of the present disclosure may, through the operation of the control unit 11, adjust the speed of the fan 24a to adjust the total amount of hydrogen peroxide vapor, or control the on/off of the heating unit 25, heating and heating temperature, and measure the hydrogen peroxide concentration, indoor temperature and humidity through the sensor 14, and display it on the display unit.

Additionally, the control unit 11 and the display unit (not shown) of the present disclosure can communicate with each other wirelessly, to enable control and operation of the system 1 in places other than the space that needs decomposition and detoxification.

Meanwhile, the moved air is secondarily decomposed by the second decomposition unit 23 as described above, and finally, is discharged (Fo) through a discharge opening 32 formed in a cover 31 of the vapor discharge unit 30.

Meanwhile, as the discharge opening 32 is formed on the side of the cover 31 as shown in FIGS. 4 and 8, the final decomposition products of hydrogen peroxide vapor may be discharged in the lateral direction of the hydrogen peroxide vapor detoxification system 1.

Figure 9:
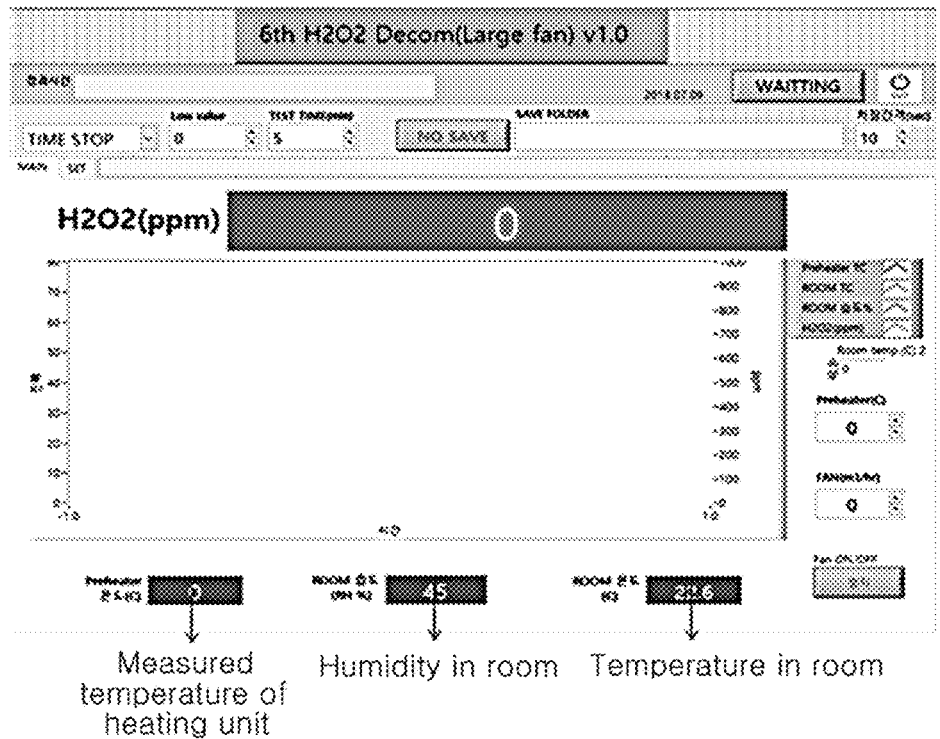
FIG. 9 is a schematic diagram showing a program operating a hydrogen peroxide vapor detoxification system according to an embodiment of the present disclosure, displayed on a display unit by a control unit of the system of the present disclosure.

FIG. 9 is a schematic diagram showing the program operating the hydrogen peroxide vapor detoxification system 1 according to an embodiment of the present disclosure, displayed on the display unit by the control unit 11 of the system of the present disclosure, and below is an experiment of the decomposition efficiency of hydrogen peroxide vapor using the hydrogen peroxide vapor decomposition and detoxification system 1 according to an embodiment of the present disclosure.

As comparative example of the experiment, the natural decomposition efficiency without applying the hydrogen peroxide vapor decomposition and detoxification system and the decomposition efficiency of the conventional product are presented.

Additionally, through comparisons of hydrogen peroxide decomposition efficiency when the heating unit 25 for optimization of the performance of the decomposition and detoxification system 1 of the present disclosure is ON/OFF, and depending on the maximum rotation speed of the fan 24a, it is intended to investigate the hydrogen peroxide decomposition efficiency of the present disclosure.

Experiment 1: Measurement of Efficiency of Natural Decomposition of Hydrogen Peroxide Vapor To test the performance of the vapor decomposition and detoxification system, efficiency of natural decomposition of hydrogen peroxide without using decomposition and detoxification equipment was measured.

First, to compare the hydrogen peroxide decomposition efficiency of each target according to the objective indication, the experiment conditions were presented as shown in Table 1.

TABLE 1

| Operating time and method of hydrogen peroxide vapor sterilization system | | |
|---|---|---|
| Volume of space to be sterilized | 58.65 m$^3$ | |
| Cycle time | Conditioning time | 7 mins |
| | Gassing time | 29 mins |
| | Dwell time | 20 mins |
| | Total time | 56 mins |
| Gas injection rate | 5 g/min | |
| Amount of H$_2$O$_2$ used | About 150 g | |

As shown in Table 1, according to the volume of the sterilization space and the operating time and method of the vapor sterilization apparatus, the concentration of hydrogen peroxide vapor in the target space to be sterilized was maintained at about 250 ppm.

Additionally, in addition to the hydrogen peroxide vapor sterilizer, four fans for quick circulation of indoor air and hydrogen peroxide vapor, and a concentration sensor of hydrogen peroxide vapor in the space (ATI hydrogen peroxide gas detector, 2-wire transmitter) and a temperature sensor (VAISALA, HMP 110) are installed in the target space of experiment, and thus the extent of decomposition of hydrogen peroxide can be observed in real time, and equipment wirelessly operates in a place outside of the target space and can collect the experiment result values.

Additionally, the fan's maximum air flow of the exhaust unit is 3,120 m$^3$/hr, and the power consumption is 250 W.

The operating temperature of the heating plate of the heating unit 25 is 125-250° C., and the power consumption is 1300 W.

Figure 10:
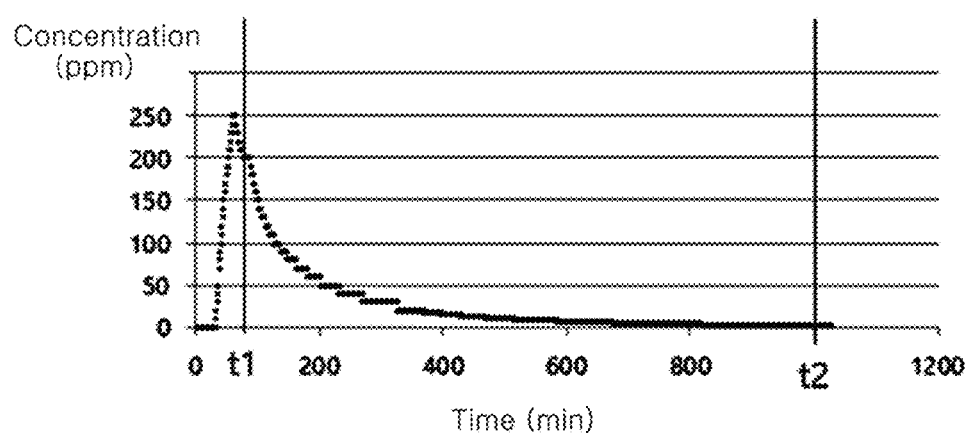
FIG. 10 is a graph showing the extent to which hydrogen peroxide vapor naturally decomposes as a function of time, when hydrogen peroxide vapor in a target space to be sterilized is 250 ppm, without the use of a hydrogen peroxide vapor detoxification system according to an embodiment of the present disclosure.

Subsequently, the efficiency of natural decomposition of hydrogen peroxide in the target space to be sterilized is shown in FIG. 10.

The period of time from the dwell time t1 to the time t2 at which the hydrogen peroxide concentration is 1 ppm or less, i.e., the time taken to naturally decompose the total amount of hydrogen peroxide vapor, was about 16 hours or longer.

Experiment 2: Hydrogen Peroxide Decomposition Efficiency Depending on ON/OFF of the Heating Unit and the Fan Speed of the Exhaust Unit To conduct experiment 2, the concentration of hydrogen peroxide vapor in the target space to be sterilized was maintained at about 250 ppm according to the volume of the sterilization space and the operating time and method of the vapor sterilization apparatus as shown in Table 1.

Figure 11:
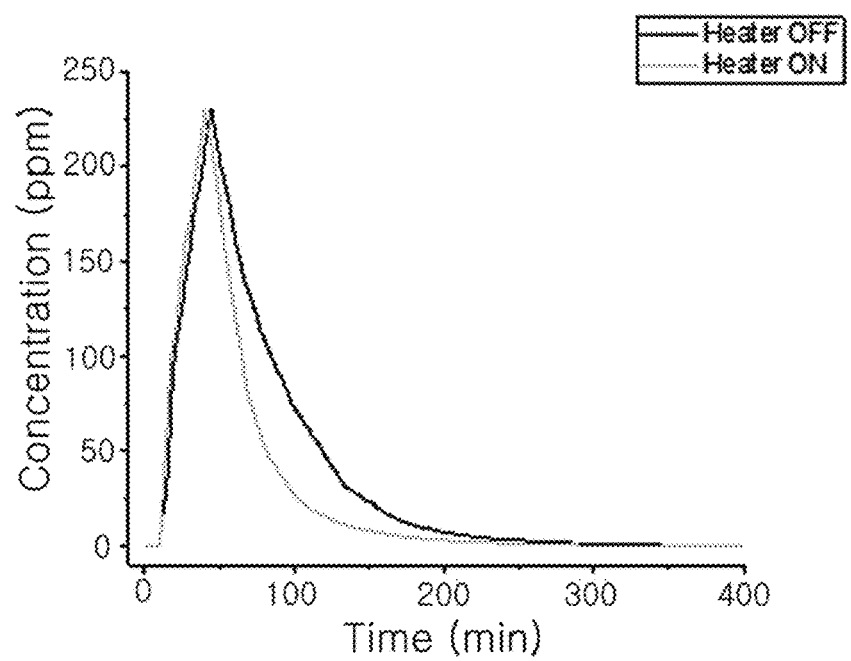
FIG. 11 is a graph showing hydrogen peroxide decomposition efficiency without or with operation of a heating unit of a hydrogen peroxide vapor decomposition and detoxification system according to an embodiment of the present disclosure.

The hydrogen peroxide decomposition efficiency was measured when the heating unit 25 is ON/OFF, and the result values of FIG. 11 could be obtained.

A time difference between t1 and t2 found the decomposition efficiency of about 30 min depending on heating or non-heating of the part where hydrogen peroxide vapor is suck.

Figure 12:
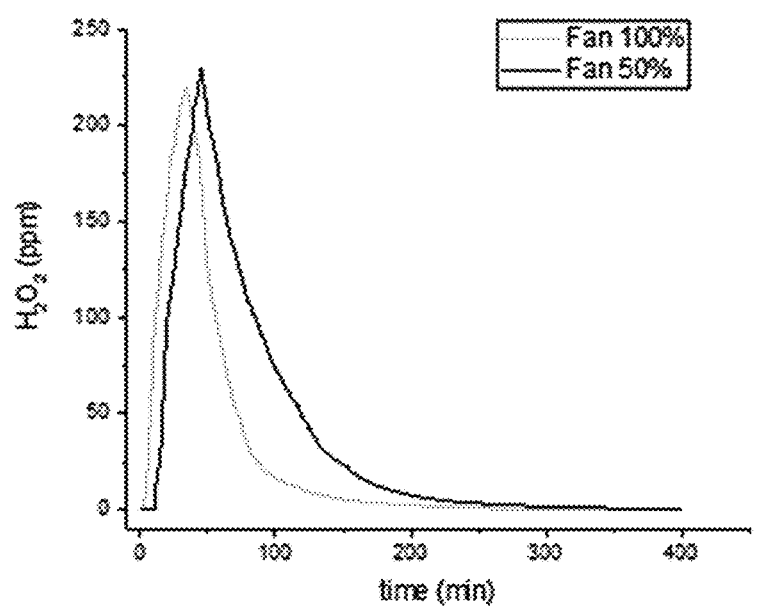
FIG. 12 is a graph showing decomposition efficiency of hydrogen peroxide vapor when a fan of a hydrogen peroxide vapor decomposition and detoxification system according to an embodiment of the present disclosure operates at 50% and 100% of the maximum speed.

Additionally, the hydrogen peroxide decomposition efficiency as a function of the speed of the fan 24a was measured. At the maximum speed corresponding to the fan's maximum air flow of 3,120 m$^3$/hr and the speed corresponding to its 50%, the hydrogen peroxide vapor decomposition efficiency was measured, and the results are shown in FIG. 12.

It can be seen that initially, at 100% of the fan speed, the hydrogen peroxide decomposition efficiency is about 30 min and is very good.

Experiment 3: Hydrogen Peroxide Decomposition Efficiency of Detoxification System The hydrogen peroxide decomposition efficiency of hydrogen peroxide vapor in the target space to be sterilized generated under the condition of the above-described Table 1 was measured using the detoxification system 1 of the present disclosure.

Maintaining the temperature of the heating plate of the heating unit 25 at 40° C. and the speed of the fan 24a at the maximum fan speed of 100% is avoided to maintain durability and stability of equipment, and during operation, the maximum speed was maintained at 70%.

Figure 13:
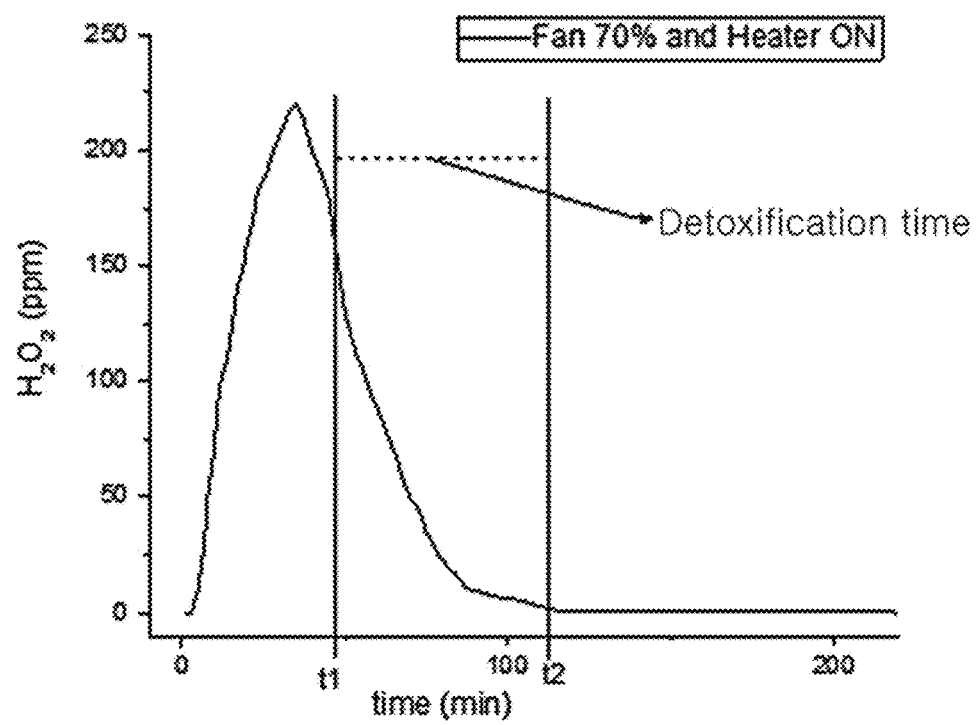
FIG. 13 is a graph showing hydrogen peroxide decomposition efficiency when both a heating unit and a fan of a hydrogen peroxide vapor decomposition and detoxification system according to an embodiment of the present disclosure operate, and the rotation speed of the fan is controlled to 70% of the maximum speed.
Figure 14:
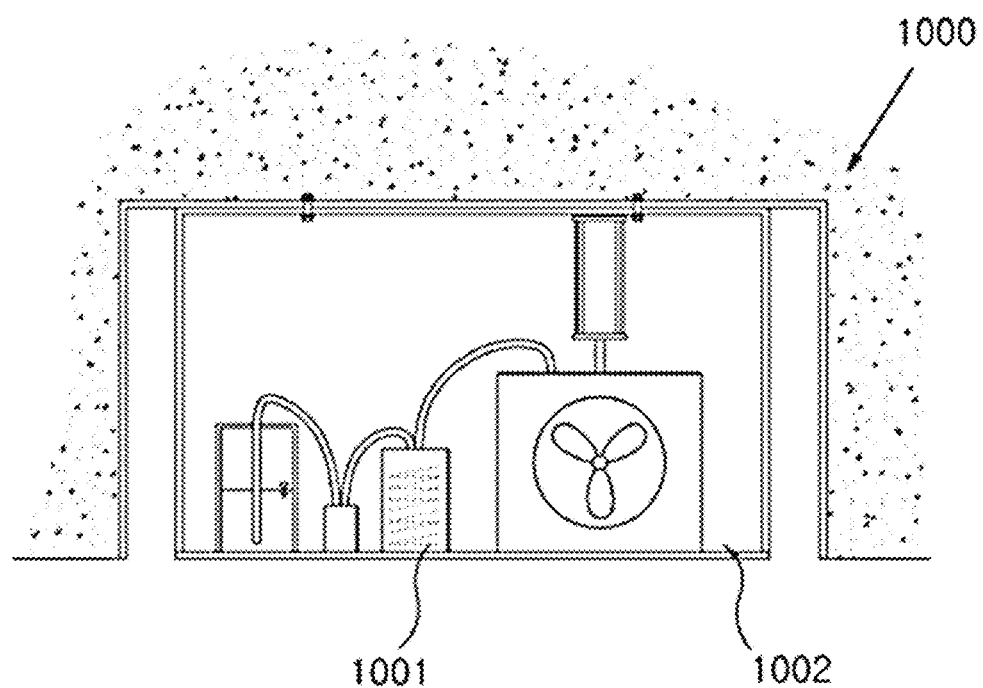
FIG. 14 is a schematic diagram of a conventional system for injecting hydrogen peroxide vapor into a target space to be sterilized.
Figure 15:
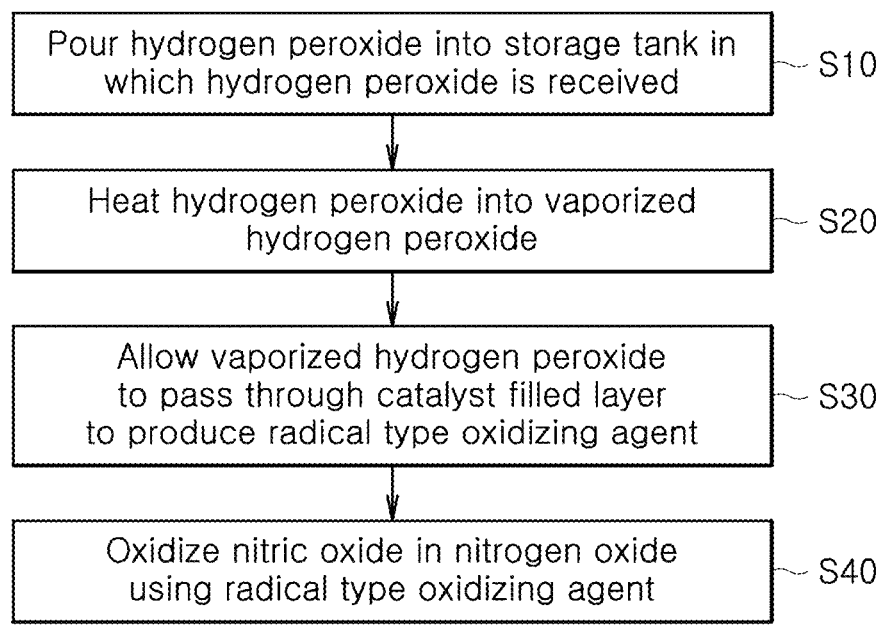
FIG. 15 is block diagram showing a conventional catalytic decomposition method of hydrogen peroxide.

Accurate values displayed on the control unit and the display unit were identified, and the hydrogen peroxide decomposition efficiency of the detoxification system of the present disclosure is shown in FIG. 13.

As shown in FIG. 13, the period of time between the hydrogen peroxide vapor decomposition start t1 after the dwell time and the time t2 at which the hydrogen peroxide concentration is 1 ppm or less was measured as about 1 h 10 min or less.

The sterilization method of target fungus to be sterilized in the target space to be sterilized by generating hydrogen peroxide vapor (HPV) basically requires about 50 min to generate active oxygen (oxygen free radical) from hydrogen peroxide molecules, and decompose, sterilize and disinfect many fungus, bacteria, viruses and gemmules, according to Table 1. Subsequently, it takes a minimum of 18 hours or longer to naturally decompose hydrogen peroxide vapor.

Accordingly, to efficiently manage or use the facility, for example, to reuse the space or equipment after sterilization, reducing the hydrogen peroxide decomposition time is the most effective method.

In conclusion, it takes about 1 hour to lower hydrogen peroxide vapor to 1 ppm or less, and it could be seen that the present disclosure is a very excellent invention that can maximize the reuse of space, facility, and equipment.

It will be understood by those having ordinary skill in the technical field pertaining to the invention that the present disclosure may be embodied in any other particular forms without departing from the technical idea or the essential feature of the present disclosure with reference to the foregoing description of the present disclosure.

Therefore, it should be understood that the embodiments described herein are for illustration in all aspects, but not intended to limit the resent disclosure to the disclosed embodiments, and the scope of the present disclosure is defined by the appended claims rather than the foregoing detailed description, and it should be interpreted that all modifications or variations derived from the spirit and scope of the appended claims and the equivalents to which the appended claims are entitled fall within the scope of the present disclosure.

The present disclosure completely decomposes hydrogen peroxide vapor immediately after sterilization of the target space to be sterilized using the hydrogen peroxide vapor decomposition and detoxification system, to remove harm resulting from hydrogen peroxide, and through this, can maximize the use efficiency of the target space to be sterilized, facility and equipment.

| Detailed Description of Main Elements | |
|---|---|
| 1: Hydrogen peroxide vapor detoxification system | |
| 10: Frame | 11: Control unit |
| 12: Caster | 13: Power source unit |
| 14: Sensor | |
| 20: Decomposition and detoxification unit | |
| 21: Housing | 22: First decomposition unit |
| 22a: Suction opening | 22b: First honeycomb structure |
| 23: Second decomposition unit | 23a: Plate |
| 23b: Second honeycomb structure | 24: Fan unit |
| 24a: Fan | 25: Heating unit |
| 25a: Heating opening | 25b: Electrical connector |
| 30: Vapor discharge unit | 31: Cover |
| 32: Discharge opening | |

What is claimed is:

1. A hydrogen peroxide vapor decomposition and detoxification system comprising:
a hydrogen peroxide vapor decomposition and detoxification unit which decomposes sucked hydrogen peroxide vapor, the hydrogen peroxide vapor decomposition and detoxification unit including a plurality of hydrogen peroxide vapor suction units which suck the hydrogen peroxide vapor in a target space to be sterilized;
a vapor discharge unit which discharges decomposition products of the hydrogen peroxide vapor, the vapor discharge unit including a plurality of discharge openings; and
a controller which controls an amount of vapor suction of each hydrogen peroxide vapor suction unit, decomposition and detoxification of the hydrogen peroxide vapor decomposition and detoxification unit, and the vapor discharge unit,
wherein each hydrogen peroxide vapor suction unit includes a first decomposition unit in the form of a first honeycomb structure to decompose the hydrogen peroxide vapor, and wherein each first honeycomb structure includes platinum and palladium as a hydrogen peroxide decomposition catalyst.

2. The hydrogen peroxide vapor decomposition and detoxification system according to claim 1, wherein the hydrogen peroxide vapor decomposition and detoxification system further comprises casters to move the hydrogen peroxide vapor decomposition and detoxification system.

3. The hydrogen peroxide vapor decomposition and detoxification system according to claim 2, wherein the casters further comprise an electric-driven device that can operate by a wireless signal.

4. The hydrogen peroxide vapor decomposition and detoxification system according to claim 1, wherein each first honeycomb structure is hermetically fixed to a suction opening formed in a respective one of the vapor suction units.

5. The hydrogen peroxide vapor decomposition and detoxification system according to claim 1, wherein the hydrogen peroxide vapor decomposition and detoxification unit further comprises a heater to heat the vapor decomposed from the first decomposition unit.

6. The hydrogen peroxide vapor decomposition and detoxification system according to claim 5, wherein the heater heats the vapor decomposed from the first decomposition unit in a range of room temperature to 250° C.

7. The hydrogen peroxide vapor decomposition and detoxification system according to claim 6, wherein the hydrogen peroxide vapor decomposition and detoxification unit further comprises a second decomposition unit to decompose the hydrogen peroxide vapor heated from the heater, and
wherein the second decomposition unit comprises:
a plate hermetically fixed to a housing of the hydrogen peroxide vapor decomposition and detoxification unit and including a plurality of openings; and
a plurality of second honeycomb structures, each second honeycomb structure being hermetically fixed to a respective opening of the plate.

8. The hydrogen peroxide vapor decomposition and detoxification system according to claim 7, wherein each second honeycomb structure includes platinum and palladium as a hydrogen peroxide decomposition catalyst.

9. The hydrogen peroxide vapor decomposition and detoxification system according to claim 8, wherein the vapor discharge unit further comprises a fan unit having a fan of which rotation speed can be adjusted by the controller.

10. The hydrogen peroxide vapor decomposition and detoxification system according to claim 9, wherein the vapor discharge unit comprises a cover which covers a top and a plurality of discharge openings formed in a side, and
wherein the decomposition products of the hydrogen peroxide vapor are discharged through the side.

11. The hydrogen peroxide vapor decomposition and detoxification system according to claim 9, wherein the hydrogen peroxide vapor decomposition and detoxification system further comprises a sensor to measure a temperature of the heater, a humidity of the target space to be sterilized, and a concentration of hydrogen peroxide vapor included in the target space to be sterilized; and
a display to display the temperature of the heater and the fan speed.

12. A hydrogen peroxide vapor decomposition and detoxification system comprising:
a hydrogen peroxide vapor decomposition and detoxification unit which decomposes sucked hydrogen peroxide vapor, the hydrogen peroxide vapor decomposition and detoxification unit including a plurality of hydrogen peroxide vapor suction units which suck the hydrogen peroxide vapor in a target space to be sterilized;
a vapor discharge unit which discharges decomposition products of the hydrogen peroxide vapor, the vapor discharge unit including a plurality of discharge openings; and
a controller which controls an amount of vapor suction of each hydrogen peroxide vapor suction unit, decomposition and detoxification of the hydrogen peroxide vapor decomposition and detoxification unit, and the vapor discharge unit,
wherein each hydrogen peroxide vapor suction unit includes a first decomposition unit in the form of a first honeycomb structure to decompose the hydrogen peroxide vapor, and
wherein the hydrogen peroxide vapor decomposition and detoxification unit further comprises a heater to heat the vapor decomposed from the first decomposition unit.

13. The hydrogen peroxide vapor decomposition and detoxification system according to claim 12, wherein the heater heats the vapor decomposed from the first decomposition unit in a range of room temperature to 250° C.

14. The hydrogen peroxide vapor decomposition and detoxification system according to claim 12, wherein each first honeycomb structure is hermetically fixed to a suction opening formed in a respective one of the vapor suction units.

15. The hydrogen peroxide vapor decomposition and detoxification system according to claim 12, wherein the hydrogen peroxide vapor decomposition and detoxification unit further comprises a second decomposition unit to decompose the hydrogen peroxide vapor heated from the heater, and
wherein the second decomposition unit comprises:
a plate hermetically fixed to a housing of the hydrogen peroxide vapor decomposition and detoxification unit and including a plurality of openings; and
a plurality of second honeycomb structures, each second honeycomb structure being hermetically fixed to a respective opening of the plate.

16. The hydrogen peroxide vapor decomposition and detoxification system according to claim 15, wherein each second honeycomb structure includes platinum and palladium as a hydrogen peroxide decomposition catalyst.

17. The hydrogen peroxide vapor decomposition and detoxification system according to claim 12, wherein the vapor discharge unit further comprises a fan unit having a fan of which rotation speed can be adjusted by the controller.

* * * * *